United States Patent [19]

Wilcox et al.

[11] 4,048,561

[45] Sept. 13, 1977

[54] APPARATUS FOR PREVENTING SIMULTANEOUS TRANSMISSION AND CHANNEL SELECTION IN A TRANSMITTER OR TRANSCEIVER

[75] Inventors: Glade Wilcox, Kalamazoo; Keith A. Packard, Greenville, both of Mich.

[73] Assignee: Robyn International, Inc., Rockford, Mich.

[21] Appl. No.: 636,021

[22] Filed: Nov. 28, 1975

[51] Int. Cl.² .......................... H04B 1/04; H04B 1/54
[52] U.S. Cl. ..................................... 325/22; 325/151; 325/171
[58] Field of Search .................. 325/15, 17, 21, 22, 325/25, 57, 123, 150, 151, 161, 166, 169, 171, 183, 185, 186, 187; 343/175, 180

[56] References Cited

U.S. PATENT DOCUMENTS

| | | | |
|---|---|---|---|
| 2,458,558 | 1/1949 | Bradley | 325/25 X |
| 2,837,650 | 6/1958 | Keen et al. | 325/171 |
| 3,253,222 | 5/1966 | Goldstein | 325/151 |
| 3,413,554 | 11/1968 | Yates et al. | 325/25 |

FOREIGN PATENT DOCUMENTS

| | | | |
|---|---|---|---|
| 2,332,022 | 1/1975 | Germany | 325/22 |

OTHER PUBLICATIONS

Translation of German Offenlegungsschrift No. 2,332,022 Jan. 16, 1975.

*Primary Examiner*—Benedict V. Safourek
*Attorney, Agent, or Firm*—Blanchard, Flynn, Thiel, Boutell & Tanis

[57] ABSTRACT

In a transmitter or transceiver having alternately selectable transmission frequency channels, frequency selection switching is actuable for switching the transmitter from channel to channel and for stopping at the desired channel. A device, such as a microphone push-to-talk switch actuates the transmitter. Lock-out circuitry, interconnected with the transmitter actuating device and frequency selection switching, precludes simultaneous transmission and channel switching. In one embodiment, operating potential is removed from channel switching circuitry when the transmitter is in actuated condition and such channel switching circuitry is supplied operating potential only with the transmitter in its nonactuated condition. In further embodiments, frequency selection switching is disabled or blocked when the transmitter is actuated and only becomes enabled when the transmitter is deactuated.

10 Claims, 5 Drawing Figures

APPARATUS FOR PREVENTING SIMULTANEOUS TRANSMISSION AND CHANNEL SELECTION IN A TRANSMITTER OR TRANSCEIVER

FIELD OF THE INVENTION

This invention relates to a radio apparatus including transmitter circuitry and more particularly to such apparatus having alternatively selectable transmission frequencies, or channels.

BACKGROUND OF THE INVENTION

Prior transmitters and transceivers, insofar as known to Applicant, have not had means for disabling the transmission mode while switching channels. This has made possible spurious transmissions by operators who hold down the transmit switch, or push-to-talk microphone switch, and at the same time switch transmission frequencies. Because of the possibility of simultaneously changing channels and transmitting, the FCC regulations, at Section 96.58(c) (2) state that: "Multi-frequency transmitters shall not provide more than 23 transmitting frequencies, and the frequency selector shall be limited to a single control." Thus, acceptable Class D Citizens Band transmitters and transceivers have been limited to one frequency selector control.

However, in many instances it is desirable to provide more than one frequency selector control for a given transmitter or transceiver. For example, in a mobile installation, the microphone is typically hand held in use by the vehicle driver as he drives the vehicle, and the transmitter or transceiver itself is typically remote from the driver, typically being installed on or near the dashboard of the vehicle. With the one frequency selector control conventionally located on the front panel of the transceiver itself, it is at least inconvenient (and may be unsafe) for the operator to simultaneously drive the vehicle, handle the microphone and attempt to manipulate the channel selector control on the transceiver front panel.

Further, with only a single channel selector control, a given transceiver cannot alternatively be used with a microphone having a channel changing capability and other microphones, such as desk types or addendums such as remote or plug-in type voice operated units, which do not have their own channel selection capability but rather require location of the channel selector on the front panel of the transmitter or transceiver itself.

Accordingly, the objects and purposes of this invention include provision of:

A radio apparatus as aforesaid, and particularly a transmitter or transceiver, such as of the Class D Citizens Band type, wherein simultaneous transmission and switching of channels is precluded.

Apparatus, as aforesaid, which precludes undesirable or impermissible radio interference caused by running the carrier from frequency to frequency with the transmitter in transmit mode either with or without modulation, and which further precludes "keying" of the transmitter or transceiver by holding down the transmitter "on" switch and switching the frequency selector in and out of the desired frequency.

Apparatus, as aforesaid, which renders permissible the provision of more than one frequency selector control in a Class D Citizens Band transmitter or transceiver by precluding operating of the transmitter while switching transmission frequencies.

Apparatus, as aforesaid, which at least for convenience permits a given transmitter or transceiver system to incorporate both a microphone-mounted frequency selector and a transmitter or transceiver front panel-mounted frequency selection control, and particularly in mobile use enhances both driving safety and flexibility in mounting of the transmitter or transceiver unit.

Apparatus, as aforesaid, wherein a microphone provided with a frequency selector control can be unplugged and removed to prevent unauthorized transmission by a transceiver, while still permitting use of the receiver portion and selection among several crystal controlled reception channels.

Apparatus, as aforesaid, wherein a transmitter or transceiver may be utilized with a variety of microphones or other voice sources, whether or not such sources include a channel selector control.

Apparatus, as aforesaid, in which prevention of simultaneous transmission and frequency selection is readily achievable in otherwise conventional transmitters and transceivers, with only minimal additional circuitry or change and at a minimal cost and is achievable in a variety of transmitter types.

Other objects and purposes of this invention will be apparent to persons acquainted with apparatus of this general type upon reading the following specification and inspecting the accompanying drawings.

SUMMARY OF THE INVENTION

The objects and purposes of the invention are met by providing a radio apparatus, such as a transmitter or transceiver, which includes transmitter circuitry having several alternatively selectable transmission frequency channels. Stepper switching is actuable for switching the transmitter from channel to channel and stopping at the desired channel. A device, such as a microphone push-to-talk switch, actuates the transmitter. Lock-out circuitry interconnects with the transmitter actuating device and stepper switching circuitry for preventing simultaneous transmission and and channel switching. In one embodiment operating potential is removed from the channel switching circuitry when the transmitting circuitry is in actuated condition and such channel switching circuitry is supplied operating potential only with the transmitter in its nonactuated condition. In further embodiments, frequency selection switching is disabled or blocked when the transmitter is actuated and only becomes enabled when the transmitter is deactuated.

DETAILED DESCRIPTION

Figure 1:
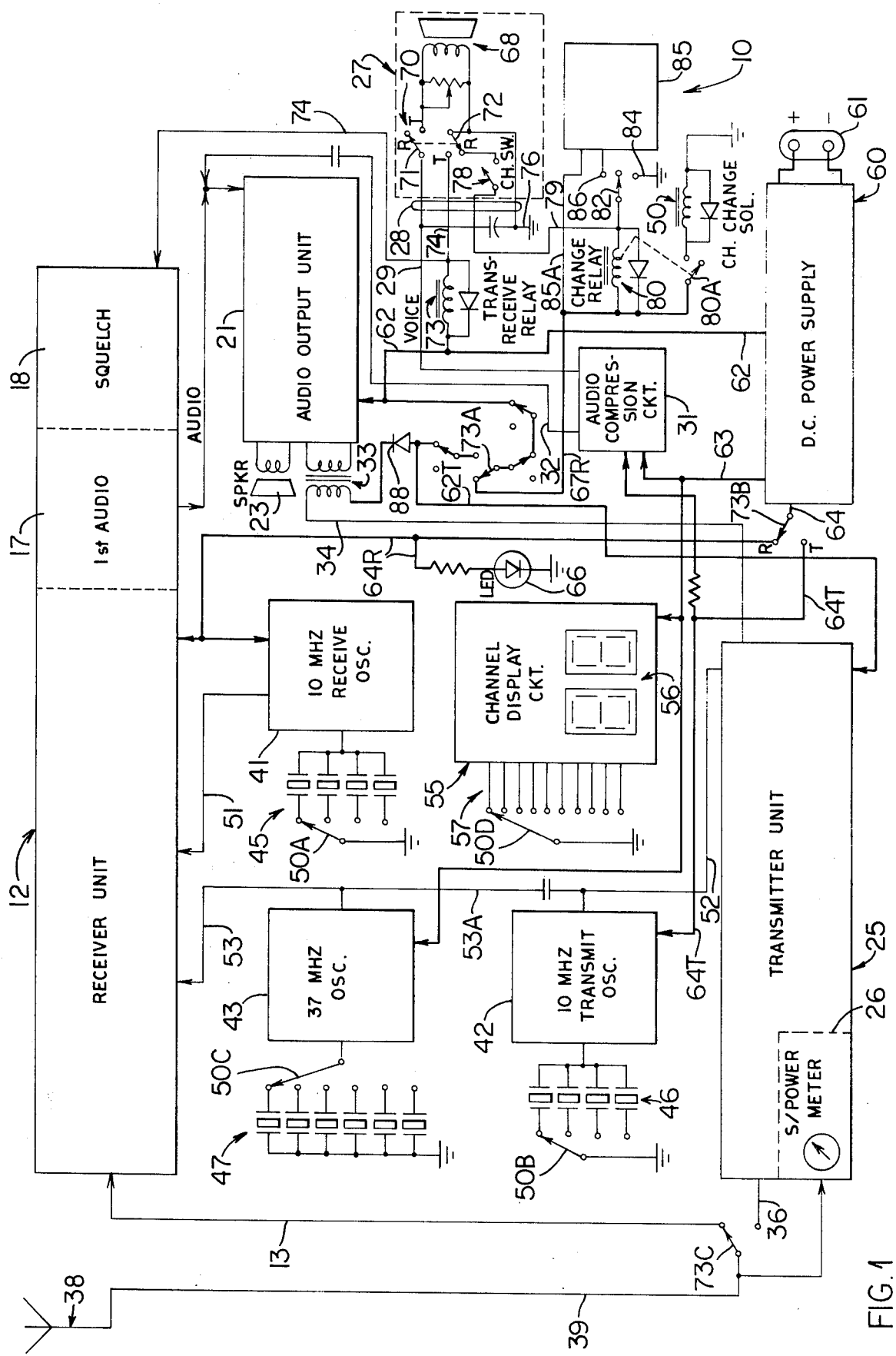
FIG. 1 is an electrical block diagram of a radio transceiver embodying the invention and incorporating solenoid activated frequency selection switching.

FIG. 1 discloses a Citizens Band transceiver 10 embodying the invention. The transceiver 10 includes a receiver unit incorporating a first audio section 17 and, if desired, a squelch section 18. The receiver unit conventionally detects the audio component of the incoming RF signal from an input line 13. The detected audio signal is passed by an audio line 19 from first audio section 17 to an audio output unit 21 which conventionally drives an audio transducer, such as a loudspeaker 23.

The transceiver 10 further includes a transmitter unit 25, which, as shown, may incorporate an S/power meter section 26. To apply a voice signal to the transmitter unit 25, a microphone unit 27, hereafter described in more detail, connects to the remainder of the transceiver circuitry through a multi-conductor cable diagrammatically indicated at 28, and which includes a voice conductor 29 connected to drive audio drive circuitry in the transceiver. Conventionally, the cable 28 is of sufficient flexibility and length to permit operator use of a hand-held microphone unit 27 at some distance from the remainder of the transceiver.

The transceiver 10 here shown includes an audio compression circuit 31. In the embodiment shown, voice signals to be transmitted are applied through line 29, the audio compression circuit 31, and a compressed audio line 32 to the audio output unit 21. Voice output is taken from the audio output unit, here through a coupling transformer 33, and applied through an audio line 34 to the modulator portion of the transmitter unit 25 in a conventional manner. The transmitter unit modulates an RF signal with such voice output and the resulting modulated RF signal appears on transmitter unit output line 36 for transmission to remote receivers or transceivers. In the embodiment shown, a common antenna 38 and antenna line 39 alternatively serves both the transmitter unit and receiver unit as hereafter discussed. The antenna line 39 also connects to the S/power meter section 26 (if provided) of the transmitter unit.

The transceiver 10 here shown includes crystal controlled oscillator means for providing alternatively selectable carrier frequencies to the receiver unit 12 and transmitter unit 25. To minimize the number of crystals required, the oscillator means here comprises a pair of crystal controlled 10MHz receive and transmit oscillators 41 and 42 cooperating with a crystal controlled common receive-transmit 37MHz oscillator 43 for synthesizing the several 27MHz Citizens Band receive and transmit channels. Connected between circuit ground and the input of oscillators 41–43 are corresponding parallel arrays of crystals 45–47, respectively, and corresponding multi-throw selector switches 50A–50C, respectively, for selecting among the crystals in the corresponding one of the arrays 45–47. The switches 50A–50C are mechanically coupled, in any conventional and convenient manner, not shown, to a channel change solenoid 50 actuable to step such switches in the desired sequence or pattern. The crystals in each array 45–47 are cut to individual frequencies in the range of their respective oscillators 41–43. The oscillators 41 and 43, through lines 51 and 53, supply the receiver unit 12 for establishing the desired channel frequency therein. The oscillators 42 and 43 have corresponding frequency outputs supplied through extension line 53A and line 52 to the transmitter unit 25 to establish the selected carrier frequency therein.

The transceiver 10 may also include a channel display circuit 55 providing a visual display 56 of the channel number corresponding to the RF channel then selected by the stepper switches 50A–50C. To this end, the channel display circuit 55 includes a plurality of input terminals 57, each corresponding to a different Citizens Band channel, and alternatively selectable by a grounded multi-throw stepper switch 50D mechanically interconnected with stepper switches 50A–50C and channel change solenoid 50, in any convenient and conventional manner, for stepping in concert with switches 50A–50C.

The transceiver 10 further includes a conventional DC power supply 60 energizable from a suitable voltage source, such as a vehicle battery, through a suitable connector 61, and providing desired DC operating potentials to the remaining transceiver circuitry through power supply output lines 62–64. In the embodiment shown, power supply line 62 continuously supplies operating potential to the audio output unit 21. Power supply line 63 continuously supplies DC operating potential to audio compression circuit 31, channel display circuit 55, and common oscillator 43. Operating potential is applied to transmitter unit 25 through a switched extension 62T of power supply line 62 as hereafter described. Further, operating potential is supplied to transmit oscillator 42 (and here also to a portion of the audio compression circuit 31 through a switched extension line 64T) by power supply line 64. Potential is applied to receiver unit 12 and receive oscillator 41, as well as to a receive mode indicator 66, through a further switched extension 64R of power supply line 64.

The interconnection between and circuitry within the above-mentioned circuitry blocks of FIG. 1, including blocks 12, 21, etc., is preferably conventional and thus needs no detailed disclosure or discussion here. While the present invention can be applied to a wide variety of known transmitters and transceivers, the transceiver 10, as above-described, provides one example of a conventional transceiver or transmitter system to which the present invention can be applied and corresponds substantially to the model GT VII C available from Robyn International, Inc., of Rockford, Michigan.

Turning now to aspects of the FIG. 1 transceiver more directly concerned with the present invention, the microphone unit 27 incorporates a microphone 68 and a press-to-talk switch 70, here a double throw manual switch. The push-to-talk switch 70 includes ganged contacts 71 and 72. Contact 71 in its actuated, transmit position connects the microphone 68 with the voice conductor 21 and in its deactuated, receive position breaks such connection. Contact 72 in its actuated, transmit position completes the connection from power supply line 62 through a transmit-receive relay 73, a conductor 74 of microphone cable 28, and thence through further microphone cable conductor 76 to circuit ground. In its deactuated, receive condition, contact 72 breaks this connection and instead connects ground conductor 76 therethrough to a manually actuable push-to-change-channel switch 78 (which is normally open and actuable to close) in turn connected through a further microphone cable conductor 79 and a channel change relay 80 to a switched potential line 62R.

A normally open contact 80A of channel change relay 80 closes upon actuation of the relay 80 to connect the channel change solenoid 50 (associated with scanning switches 50A–50D above-discussed) to the switched power line 62R.

A further manually actuable channel change switch 82 is preferably mounted on the front panel of the transceiver 10 itself. The switch 82 has a normal "off" position shown but is manually actuable, either to directly ground the relay 80 through a direct ground contact 84 or, alternatively, to periodically ground relay 80 through connection to an electronic sequence switch 85 connected to switch terminal 86. The electronic sequence switch 85 may be a conventional multi-vibrator responsive to application of operating potential thereto through the path 62R, 80, 82, 86 for periodically switching on and off current flow through the relay 80 and thus through contact 80A periodically turning on and off the channel change solenoid 50 for advancing the stepper switches 50A–50D.

The transmit-receive relay 73 controls several double-throw transmit-receive contacts, as at 73A, 73B and 73C. Of these, contact 73C connects the antenna line 39 from antenna 38 alternatively to the receiver input line 13 or the transmitter output line 36. Contact 73B applies operating potential from power supply line 74 alternately to the mentioned power line 64T or power line 64R. Contact 73A in its transmit position connects power supply 62 through line 62T to the transmitter unit 25 and through a diode 88 provides bias to one side of the secondary winding of coupling transformer 33. In its receive position, contact 73A applies operating potential from power line 62 to the power line 62R, in turn connected to the channel change relay 80, its contact 80A and an operating potential supply line 85A for the electronic sequence switch 85. While the movable contact 73A is shown in FIG. 1 as being connected through several series switches to the line 62, such switches are provided for functions not pertinent to the present invention and the connection from line 62 to contact 73A may be considered a direct one for present purposes.

OPERATION

The internal operation of, and interaction between, the several circuit blocks 12, 21, etc. housed within a transceiver housing, in the transmit and receive modes of the receiver, in terms of transmission through antenna 38 of voice signals supplied by microphone 68, and in terms of reproducing an audio message at speaker 23 upon reception of a transmission from a remote unit through antenna 38, will be clear from the foregoing description and are basically conventional, so as to require no further description.

Turning to aspects of operation more directly concerned with the present invention, the present invention precludes simultaneous transmission and switching between the several operating frequencies alternatively available from the crystals 45–47 and corresponding oscillators 41–43. Only in the receive mode of the transceiver can the several available frequencies be scanned, or the transmission channel changed.

More particularly, with the push-to-talk switch 70 on the microphone in its nonactuated, receive position shown in FIG. 1, the transceiver is in its receive mode. In this condition, the transmit-receive relay 73 is de-energized, its ground path being broken, as shown, at contact 72. Consequently, contacts 73A–73C are in their receive (R) positions shown in FIG. 1, such that no operating potential is applied to diode 88, transmitter potential supply line 62T or transmit oscillator 42. Moreover, transmit output line 36 is disconnected from the antenna. The transmitter unit 25 is thus disabled and no RF transmission can occur.

On the other hand, contacts 73B and 73C, so positioned, enable operation of the transceiver in its receive mode. More of interest, contact 73A in its receive (R) position supplies operating potential from line 62 through switched power line 62R to electronic sequence switch 85 (through line 85A), to normally open channel change relay contact 80A, as well as to channel change relay 80 and therethrough to the transmitter-based and microphone-based channel change switches 82 and 78, respectively. By manually actuating either one of switches 82 and 78, the operator completes the ground path of channel change relay 80, actuating same to close contact 80A and thereby apply operating potential to the channel change solenoid 50. Solenoid 50, upon each such activation and by conventional means, advances switches 50A–50D in such manner as to shift from a given carrier channel to the next in sequence and to accordingly update the channel display 56. In the embodiment shown, each manual actuation of switch 82 to its direct ground contact 84, or each manual actuation (closure) of the microphone channel change switch 78 (due to the path to ground afforded through switch 72 in its receive position R shown) provides one actuation of channel change solenoid 50 and hence a single step from one channel to the next. On the other hand, for automatic scanning, the operator manually shifts channel change contact 82 to the input terminal 86 of electronic sequence switch 85 which then periodically turns on and off relay 80 and solenoid 50 to cause scanning over a series of channels and a corresponding display at 56.

To place the transceiver 10 in its transmit mode, the operator holds down (actuates) the push-to-talk switch 70 on the microphone. As a result, transmit-receive relay 73 is actuated and locates its contacts 73A–73C in their transmit (T) positions. Thus, operating potential from the power supply becomes applied to diode 88, transmitter supply line 62T, and through line 64T to the audio compression circuit 31 and transmit oscillator 42. Also, antenna 38 is connected to the transmitter output line 36. Thus, the transmitter transmits an RF signal on the selected channel and which is modulatable by voice signals from the microphone.

With the transceiver in its transmit mode, contact 73A provides no operating potential to any of elements 85, 80 and 80A, precluding any channel switching while the push-to-talk switch 70 is actuated.

MODIFICATIONS

FIGS. 2–5 disclose further examples of transmitter or transceivers embodying the present invention.

Figure 2:
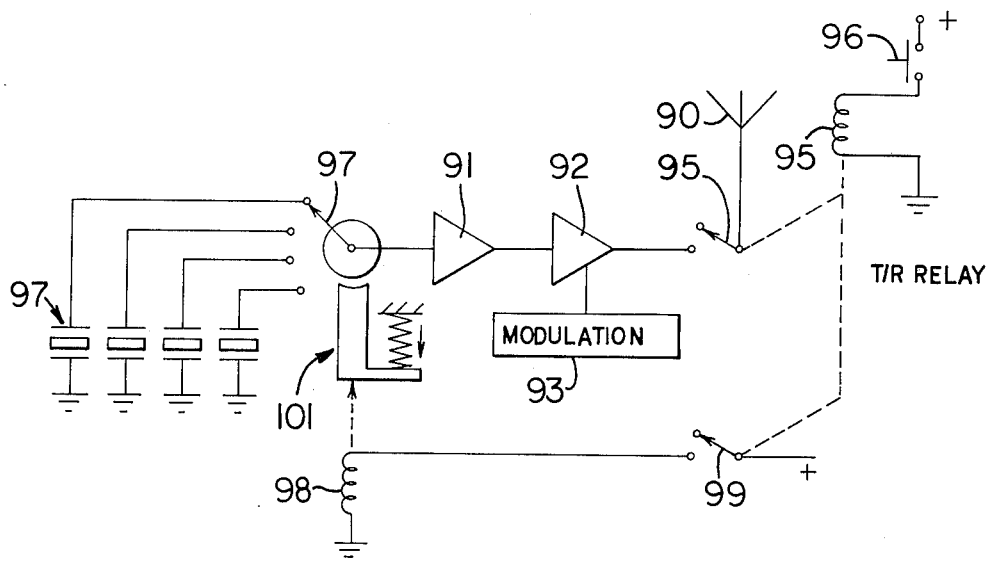
FIG. 2 is a partial block diagram of a radio transceiver embodying a modification of the present invention and wherein frequency selection is accomplished by a rotary switch.

FIG. 2 diagramatically indicates the transmitter portion of a transmitter or transceiver and which conventionally includes an RF oscillator-mixer section 91 which supplies an RF carrier to an amplifier section 92, which is also fed from a modulation source 93, such as a microphone and audio amplification circuitry driven thereby, for providing a modulated RF carrier output. The latter is applied to an antenna 90 through one position of a contact 94 of a transmit-receive relay 95 in response to operator actuation of a push-to-talk switch 96 on the microphone. In this embodiment, a frequency selection switch 97 is actuable manually (or if desired by automatic means) to select among or sweep a set of parallel crystals 97 cut to different frequencies, so as to vary the carrier frequency provided by oscillator 91. The FIG. 2 apparatus as above-discussed is conventional and typical of transmitters and transceivers employing rotary frequency selection switches.

In FIG. 2, simultaneous carrier channel switching and transmission are precluded. More particularly, in the transmit mode of the apparatus, a detent solenoid 98 is energized by operating potential from the transceiver power supply through a further transmit-receive contact 99 of transmit-receive relay 95 in response to actuation of the push-to-talk switch 96. The detent solenoid 98, when thus energized, locks the frequency selection switch 97 against rotation by engaging same with a suitable braking or locking device schematically indicated at 101. On the other hand, deactuation of the push-to-talk switch 96 places the transceiver in its receive or non-transmit mode, de-energizes the detent solenoid 98, and thereby disengages locking device 10 and permits frequency selection by rotation of switch 97.

Figure 3:
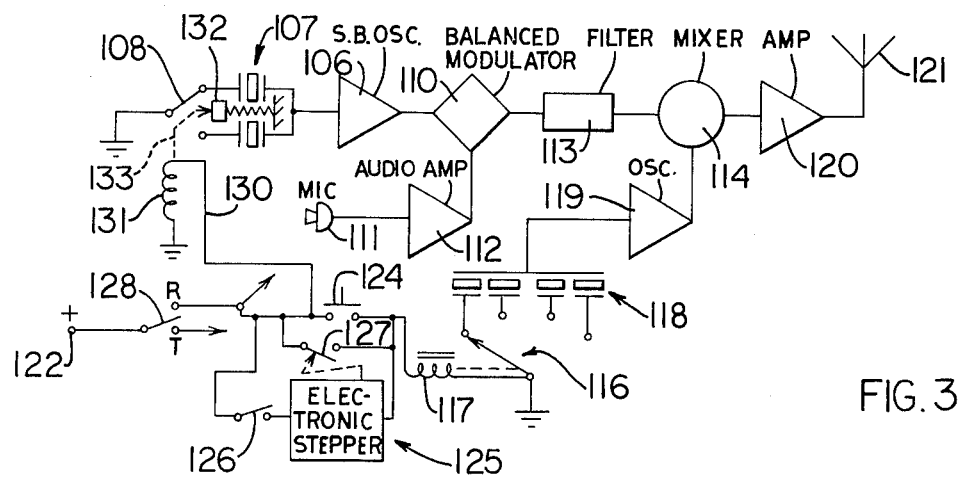
FIG. 3 is a partial block diagram of a further transceiver embodying the invention and of the type incorporating a side band selector switch and carrier frequency selection by a solenoid actuated switch.

FIG. 3 diagramatically illustrates a conventional transmitter unit of single side band type. The operating frequency of a side band oscillator 106 is determined by alternative selection between a pair of side band frequency crystals 107 by means of a double throw manual side band selector switch 108. The side band frequency output of oscillator 106 is modulated in a balanced modulator 110 by an audio signal presented thereto from a microphone 111 and series audio amplifier 112. The modulator 110 output is passed by a filter 113 to a mixer 114. A carrier frequency selector switch 116 is stepped by a solenoid 117 from one to another of plural carrier frequency crystals 118. The crystals 118 connect in parallel to the input of a carrier frequency oscillator 119 and selection of a given crystal 118 by the switch 116 grounds such crystal causing the oscillator 119 to oscillate at the frequency of the selected crystal. The carrier frequency output of the oscillator 119 is applied to the mixer 114 which in turn supplies the modulated side band frequency through RF amplifier 120 to a transmitting antenna 121 in a conventional manner.

The solenoid 117 steps the carrier frequency selector switch 116 one step per activation thereof. The solenoid 117 is actuable from the positive terminal 122 of the transmitter unit power supply (not shown), either through manual closure of a normally open manual channel change switch 124, or alternatively through a parallel-connected electronic stepper circuit 125 (e.g., a free running multi-vibrator). When a switch 126 in series therewith is closed, the electronic stepper periodically closes and opens the path across the manual switch 124 to sequentially turn on and off the solenoid 117 and step the frequency selector switch 116. While the electronic stepper 125 would normally carry out its closing and opening action electronically, it is here shown for purposes of illustration as controlling a mechanical switch 127.

In FIG. 3, simultaneous transmission and frequency switching (both side band and carrier frequency switching) is precluded, and frequency switching is permitted only with the apparatus in its non-transmit, or receive, mode. More particularly, a send-receive contact 128, which may be part of the usual microphone push-to-talk switch or a contact indirectly controlled thereby through a relay not shown, has alternately selectable send and receive positions. Application of operating potential from a power supply terminal 122 to the transmitter elements 106, 110-114, 119 and 120 above-described is required to enable transmission and occurs only with contact 128 in its send position. On the other hand, only in its receive position does contact 128 apply potential from the power supply terminal 122 to the manual carrier stepper switch 124 and the actuating switch 126 for the electronic stepper 125 to enable stepping of the carrier frequency by selector switch 116 as above described.

Suitable locking means 132 normally lock the side band selector switch 108 to prevent switching from one side band to the other. The locking means 132 may be of any desired construction and is here illustrated as a mechanical locking member 132 spring-biased into the path of movement of side band selector switch 108 to positively lock same in a position connecting one or the other of side band crystals 107 with ground. A detent solenoid 131 is energizable to remove the locking member 132 from the path of movement of side band switch 108, by any conventional mechanical connection schematically indicated by dotted line 133. In addition, only in its receive position does the send-receive contact 128 supply energizing potential from terminal 122 through a line 130 to the detent solenoid 131. The detent solenoid 131, when so energized in the receive mode of the apparatus, unlocks the side band selector switch 108, permitting manual actuation thereof to change from lower to upper side band and vice versa. On the other hand, send-receive contact 128 in its transmit position de-energizes detent solenoid 131, locking the side band selector switch against manual actuation.

Thus, placement of the transmitter in its transmit mode and shifting of frequency selector switches 108 and 116 are mutually exclusive conditions.

Figure 4:
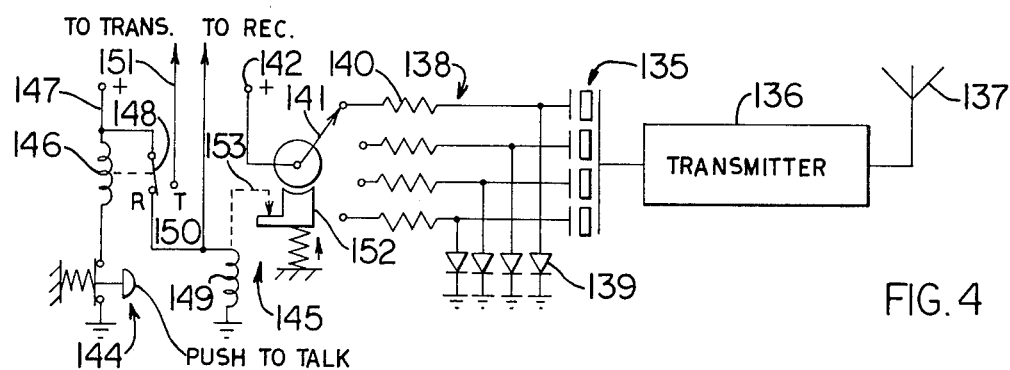
FIG. 4 is a partial block diagram of a transceiver embodying the invention and incorporating carrier frequency selection by diode switching.

FIG. 4 diagramatically illustrates a further transmitter or transceiver transmitting section having a remote, diode switched frequency selection facility. One side of each of a plurality of alternatively selectable carrier frequency crystals 135 connects to transmitter circuitry generally indicated at 136 and which in turn feeds a transmitting antenna 137. A diode switching network 138 connects to the other side of each of the crystals 135. Each network 138 comprises a diode 139 connecting the corresponding crystal 135 to ground and the resistor 140 connecting the juncture of each crystal and diode to a corresponding, alternatively selectable terminal of a multi-position carrier frequency selector switch 141 having a movable contact connected to a power supply terminal 142.

By use of the diode switching system 138, the frequency selector switch 141 may conveniently be located remotely from the crystals 135. Conventionally, selection of a given crystal by the multi-throw switch 141 flows current from power supply terminal 142 through the corresponding dropping resistor 140 causing conduction of the corresponding diode 139 to ground. The conductive diode 139 thus clamps its corresponding crystal 135 substantially at ground potential and the transmitter 136 transmits at the carrier frequency determined by the grounded crystal 135. The carrier frequency selector switch 141 may be operated manually or, by conventional automatic stepping means (e.g., as in FIG. 3) for changing the carrier frequency of transmitter 136.

In FIG. 4, simultaneous transmission and carrier frequency switching is precluded. More particularly, a microphone-mounted push-to-talk switch 144 controls a locking apparatus 145 for locking the carrier frequency selector switch 141 in fixed location when the transmitter 136 is energized to transmit, but permitting shifting of frequency selector switch 141 when the transmitter is disabled. The locking apparatus 145 is here illustrated by a spring-biased locking member 152 normally engageable with the movable contact of carrier frequency selector switch 141 for locking same in position. On the other hand, a detent solenoid 149, when activated, acts through any convenient means, schematically indicated by broken line 153, to disengage locking member 152 from the movable contact of carrier frequency selector switch 141, thus permitting shifting of such frequency selector switch to change the carrier frequency of transmitter 136.

To control the locking apparatus 145, the microphone push-to-talk switch 134 is here in series with a transmit-receive relay 146, between a potential supply terminal 147 of a conventional power supply and ground, for energizing the relay 146 in its nonactuated (non-transmit) state. A contact 148 of relay 146 connects power supply terminal 147 to detent solenoid 149, and if desired to power supply inputs of a receiver through a path 150, with the push-to-talk switch non-activated (closed). Thus actuated detent solenoid 149 disengages locking member 152 and permits frequency selection by switch 141. On the other hand, with the push-to-talk switch 144 actuated (opened), relay 146 is de-actuated and its contact 148 swings to a transmit position, supplying operating potential to transmitter 136 through a path 151 and de-energizing detent solenoid 149 (and receiver power supply line 150 if present). Thus, deactuated detent solenoid 149 permits locking of carrier frequency selector switch 141 by locking member 152 at the then selected network 138 and thereby precludes changing carrier frequency during transmission.

Figure 5:
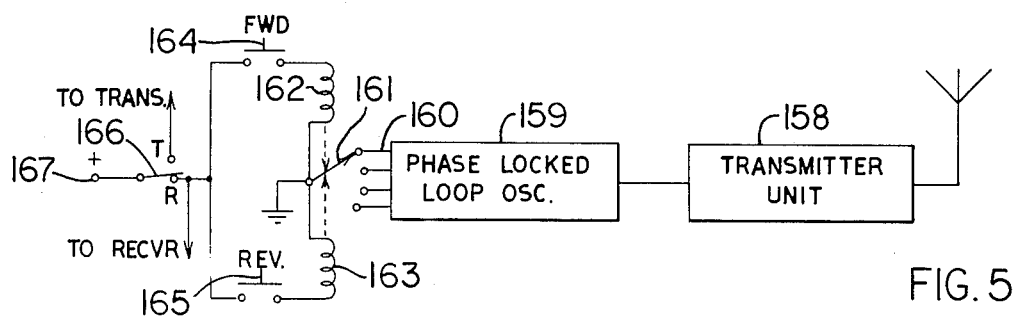
FIG. 5 is a partial block diagram of a transceiver embodying the invention and incorporating a switchable frequency phase locked loop oscillator.

FIG. 5 diagramatically illustrates a further transmitter unit 158 having a phase locked loop carrier oscillator 159 of conventional type. The frequency of carrier oscillator 159 is determined by alternative connection of its several inputs 160 to ground by a stepper switch 161 shiftable in opposite directions upon actuation of corresponding forward and reverse stepper solenoids 162 and 163. The stepper solenoids 162 and 163 commonly connect to ground and also respectively connect through corresponding normally open forward and reverse channel change switches 164 and 165 to the receive terminal of a transmit-receive switch 166 in turn connected to an operating potential supply terminal 167. The transmit-receive switch 166 may be a microphone push-to-talk switch or a switch suitably controlled thereby as in above-discussed embodiments. Switch 166 in its transmit (T) position may be arranged to supply operating potential from terminal 167 to the transmitter unit 158 and oscillator 159 to enable or cause radio transmission. In its alternative receive (R) position switch 166 disables such transmission circuitry and instead applies operating potential to the switches 164 and 165, whereupon closure of either activates the corresponding solenoid 162 or 163 to forwardly or reversely step the stepper switch 161 and thereby change the frequency of oscillator 159. Thus, simultaneous transmission and frequency switching or scanning are precluded.

Although preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are devined as follows:

1. A radio apparatus, comprising:
a radio transmitter having several alternatively selectable transmission frequencies and a switch connected to said transmitter and having transmit and receive positions, said switch being manually actuable between its transmit and receive positions;
means actuable for switching said transmitter from frequency to frequency among said several frequencies and for stopping said switching at the desired one of the several frequencies; and
locking means operatively connected to said switch and to said frequency switching means and responsive to the position of said switch for preventing any transmitter frequency switching with said manually actuable switch in its transmit position and for permitting such transmitter frequency switching only with said switch in its receive position.

2. A radio apparatus, comprising:
a radio transmitter having several alternatively selectable transmission frequencies and means for actuating said transmitter to transmit;
means for switching said transmitter from frequency to frequency among said several frequencies and for stopping said switching at the desired one of the several frequencies;
locking means coupled to said actuating means and frequency switching means for preventing simultaneous transmission and frequency switching, said transmitter actuating means including a switch means actuable to a first position to enable carrier frequency transmission by said transmitter and alternately actuable to a second position to disable said transmitter, said locking means including means responsive to positioning of said switch means for enabling said frequency switching means only with said switch means in said second position.

3. A radio apparatus, comprising:
a radio transmitter having several alternatively selectable transmission frequencies and means for actuating said transmitter to transmit;
means for switching said transmitter from frequency to frequency among said several frequencies and for stopping said switching at the desired one of the several frequencies;
locking means coupled to said actuating means and frequency switching means for preventing simultaneous transmission and frequency switching; and
oscillator means associated with a plurality of different frequency crystals selectable to establish the carrier frequency of said transmitter, said frequency switching means including a channel change solenoid means and multi-position stepper switch means connected in circuit with said oscillator means and crystals and operable in response to actuation of said channel change solenoid means for selecting in predetermined sequence among said crystals to sequentially step said transmitter from one transmission frequency to the next.

4. The apparatus of claim 3, including means for visually indicating the transmission frequency to which the transmitter is tuned and which includes a further multi-position switch means stepped by said channel change solenoid means in concert with said crystal selecting multi-position switch means.

5. The apparatus of claim 3 in which said transmitter further includes a microphone, said transmitter actuating means including a transmit-receive switch on said microphone, said frequency switching means further including a change channel switch on said microphone, a channel change relay means connected in a series path with said change channel switch and a receive contact of said transmit-receive switch, said channel change relay means being actuable for energizing said channel change solenoid means wherein said microphone change channel switch is operative to change the transmitter frequency except with said microphone transmit-receive switch in its transmit position;

said transmitter further including a transmit-receive relay means connected in series with said microphone transmit-receive switch across said power source and energizable from said source only with said microphone transmit-receive switch in its transmit position, said transmit-receive relay means including a first transmit-receive contact which in its receive position interconnects said power source to said series path through said channel change relay means and microphone change channel switch and said receive contact of said microphone transmit-receive switch so as to apply operating potential to said series path only with said first transmit-receive contact in its receive position;

said channel change solenoid means being connected in series with a contact of said channel change relay means and said first transmit-receive contact across said power source wherein operating potential is applied to said channel change solenoid means only in response to actuation of said channel change relay and positioning of said transmit-receive switch in its receive position, such that changing of transmission frequency by actuation of said microphone change channel switch is precluded with the transmitter in its transmit mode, said frequency switching means further including additional change channel switching means located at said transmitter and remote from said microphone, said additional change channel switching means being connected in parallel with said microphone change channel switch and the receive contact of said microphone transmit-receive switch and providing an alternatively selectable series path through said receive position of said first transmit-receive contact and said channel change relay means, such that the transmission frequency can be changed either in response to actuation of said microphone channel switch or said additional change channel switching means at said transmitter, but wherein energization of said channel change relay means is blocked with said first transmit-receive contact in its transmit position.

6. A radio apparatus, comprising:

a radio transmitter having several alternatively selectable transmission frequencies and means for actuating said transmitter to transmit;

means for switching said transmitter from frequency to frequency among said several frequencies and for stopping said switching at the desired one of the several frequencies;

locking means coupled to said actuating means and frequency switching means for preventing simultaneous transmission and frequency switching; and a microphone carrying a push-to-talk switch and a push-to-change-channels switch, said transmitter having a further channel change switch means located thereon remote from said microphone, said transmitter further having a power supply and a transmit-receive relay in series with the talk position of said push-to-talk switch across said power supply, such that said transmit-receive relay is energized by actuation of said microphone push-to-talk switch, said frequency switching means including stepper switch means for selecting the transmission frequency and solenoid means actuable by said power supply for stepping said stepper switch means, said transmit-receive relay having a first transmit-receive contact which in its transmit position disconnects the power supply from said solenoid means to preclude channel changing with the transmitter in its transmit mode.

7. A radio apparatus, comprising:

a radio transmitter having several alternatively selectable transmission frequencies and means for actuating said transmitter to transmit;

means for switching said transmitter from frequency to frequency among said several frequencies and for stopping said switching at the desired one of the several frequencies;

locking means coupled to said actuating means and frequency switching means for preventing simultaneous transmission and frequency switching, said frequency switching means comprising at least one multi-position switch means and a plurality of crystals having corresponding frequencies and sequentially selectable by said multi-position switch means, said transmitter including oscillator means in circuit with said crystals and multi-position switch means for varying the oscillator frequency by sequencing of said multi-position switch means, said transmitter including transmit-receive contact means actuable between transmit and receive positions whereat, respectively, the transmitter is enabled for producing a carrier frequency and disabled, a power supply for said transmitter, detent means connected in series with the transmit side of one of said transmit-receive contacts across said power supply, said detent means being coupled to the movable contact of said multi-position frequency selection switch means for blocking movement thereof when said detent means is energized from said power supply through closure of said one transmit-receive contact to its transmit position, said detent means being disabled with said transmit-receive contacts in their receive positions so as to permit frequency selection by said multi-position switch means.

8. A radio apparatus, comprising:

a radio transmitter having several alternatively selectable transmission frequencies and means for actuating said transmitter to transmit;

means for switching said transmitter from frequency to frequency among said several frequencies and for stopping said switching at the desired one of the several frequencies;

locking means coupled to said actuating means and frequency switching means for preventing simultaneous transmission and frequency switching, said transmitter comprising a side band transmitter including a side band oscillator and a carrier oscillator and sets of crystal associated with said oscillators for determining the operating frequencies thereof, the crystals for each said oscillator being alternatively selectable and including a multi-position carrier switch means connected to said set of carrier crystals and shiftable to change the selected carrier frequency, said transmitter including a transmit-receive switch having a movable contact energizable from a power supply and fixed transmit and receive contacts selectable thereby, means for stepping said multi-position carrier switch means and solely energizable from said power supply through said receive contact of said transmit-receive switch, such that the carrier frequency can be changed only in the receive mode of said apparatus, a manual switch actuable for selecting the desired side band frequency, detent means connected between ground and the receive contact of said transmit-receive switch and responsive to switching of said transmit-receive switch to its transmit position for blocking manual shifting of said side band selector switch.

9. A radio apparatus, comprising:

a radio transmitter having several alternatively selectable transmission frequencies and means for actuating said transmitter to transmit;

means for switching said transmitter from frequency to frequency among said several frequencies and for stopping said switching at the desired one of the several frequencies;

locking means coupled to said actuating means and frequency switching means for preventing simultaneous transmission and frequency switching; and a plurality of alternatively selectable frequency determining crystals each having one side connected to a carrier frequency oscillator for determining the oscillation frequency thereof, a diode switching network connected to the remaining side of each said crystal and comprising, for each crystal, a series resistance and a diode connected to ground, the remaining side of each of said resistors being connected to corresponding fixed contacts of a multi-throw frequency selection switch, said selection switch having a movable contact connected to a voltage supply, detent means coupled to said multi-throw frequency selection switch and having a first state in which it locks said selection switch against movement and a second state in which it permits movement of said switch to change carrier frequency, a push-to-talk switch actuable for causing said transmitter to transmit the selected said frequency, means responsive to actuation of said push-to-talk switch and coupling same to said detent means for placing the latter in its first said state, and means responsive to deactuation of said push-to-talk switch for placing said detent means in its second state, means responsive to selection of a said fixed selection switch contact for rendering conductive the corresponding network diode and causing such diode to activate the corresponding crystal.

10. A radio apparatus, comprising:

a radio transmitter having several alternatively selectable transmission frequencies and means for actuating said transmitter to transmit;

means for switching said transmitter from frequency to frequency among said several frequencies and for stopping said switching at the desired one of the several frequencies;

locking means coupled to said actuating means and frequency switching means for preventing simultaneous transmission and frequency switching; and a phase locked loop oscillator having a plurality of inputs alternatively selectable for determining a different carrier frequency of said transmitter, a movable frequency selection contact connected to the ground side of a voltage supply, forward and reverse stepper solenoids coupled to said movable contact and respectively actuable for shifting said contact in a forward and reverse direction to change the transmitter carrier frequency, a transmit-receive switch having movable contact means connected to the remaining side of the potential source and selectable transmit and receive fixed contacts, normally open forward and reverse stepping switches respectively connecting a corresponding said stepper solenoid to the fixed receive contact of said transmit-receive switch, such that each stepper solenoid is energizable by actuation of its corresponding forward or reverse switch to change the frequency of said oscillator only when said transmit-receive switch is in its receive position.

* * * * *